United States Patent Office 3,521,691
Patented July 28, 1970

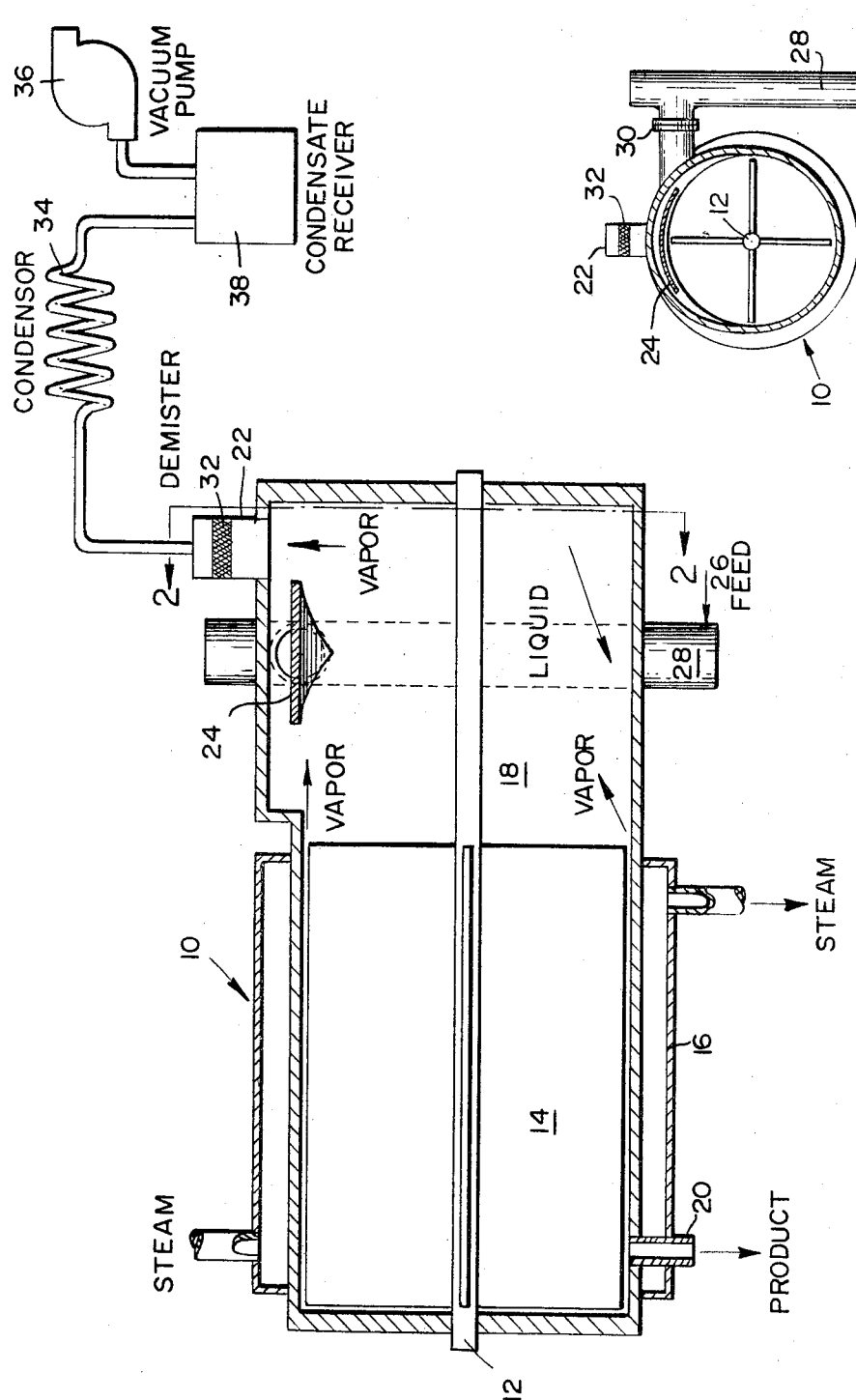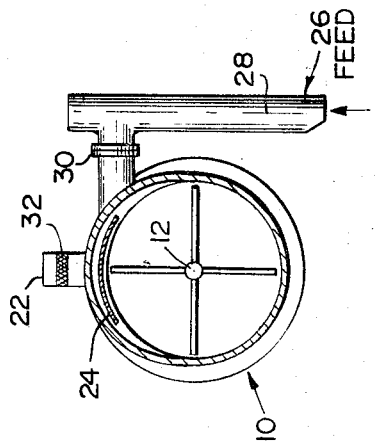

3,521,691
MULTISTAGED MOVING FILM AND WIPED FILM EVAPORATORS
James Donovan, Cambridge, Mass., assignor to Artisan Industries Inc., Waltham, Mass., a corporation of Massachusetts
Continuation-in-part of application Ser. No. 628,592, Apr. 5, 1967. This application Jan. 6, 1969, Ser. No. 798,851
Int. Cl. B01d 1/10, 1/22
U.S. Cl. 159—6                    19 Claims

ABSTRACT OF THE DISCLOSURE

An evaporation apparatus which includes a horizontal thin-film evaporator having a vapor chamber with the vapor flowing counter-current to the feed material in combination with a single pass evaporator to introduce a preheated feed stream into the vapor chamber. The chamber is maintained under conditions such that separation of the volatile components of the feed stream occurs in the vapor chamber. The non-volatilized feed stream or liquid is then processed through the thin-film evaporator with the process vapor removed through the vapor chamber, with the said volatile components to a common condensing system.

BACKGROUND OF THE INVENTION

It is often desirable to subject a feed stream to several distillation or evaporative steps for the separation of its components. Such steps may include one or more passes through a thin film type evaporator or a distillation column with separate vacuum and condensing systems, such as illustrated in U.S. Pat. No. 2,895,886, issued July 21, 1959. For some feed streams comprising, for example, a highly volatile component like an alcohol or ketone, a component of lower volatility such as a higher molecular weight material like an ester, or water, and a relatively non-volatile fraction such as ester plasticizer, a resin, rubber, urea and the like, the use of a multiple stage distillation apparatus with separate condensing systems is often expensive and complex. An evaporative apparatus of low cost, simplicity in operation and construction, and in which heat or temperature-sensitive materials can be processed would be advantageous.

SUMMARY OF THE INVENTION

My invention provides for a simple, low cost evaporative apparatus which combines a mechanically-agitated thin-film evaporator with a rising or falling film evaporator and in which the vapor chamber of the mechanically-agitated thin-film evaporator is employed as the separation chamber for a non agitated thin-film evaporator or rising film evaporator.

My apparatus permits a preheated feed stream to be introduced into thin-film evaporators for processing in the usual manner, but permits the use of a single vapor chamber to withdraw process vapor from the thin-film processing section and to accomodate the volatile components from the evaporation of the feed stream introduced into the vapor chamber. Further, such a system avoids multiple passes for heat or temperature-sensitive materials, and permits a single vacuum and condensing system to be used.

It is a surprising feature of my invention that many processing and cost advantages are obtained over other more complex systems. For example, the use of a mechanically agitated thin-film evaporator with concurrent flow, that is, with a vapor chamber at the product end, see U.S. Pat. No. 2,927,634, would not permit the direct introduction of feed into a common chamber as described and would also require additional conduits and valves while my system requires only a single condenser.

For the purpose of illustration, my invention will be described in connection with the use of a cylindrical mechanically-agitated thin-film evaporator having rectilinear rotor blades, but if desired, a tapered thin-film evaporator such as described in U.S. Pat. No. 3,253,643, issued Mar. 8, 1960, or other types of mechanically-agitated thin-film evaporators may be used.

BRIEF DESCRIPTION OF THE DRAWINGS

FIG. 1 is a diagrammatic view which shows an evaporation system for separating a feed stream into a condensate and liquid fraction.
FIG. 2 is a side view of FIG. 1 along lines 2—2.

DESCRIPTION OF THE PREFERRED EMBODIMENTS

Figure 3:
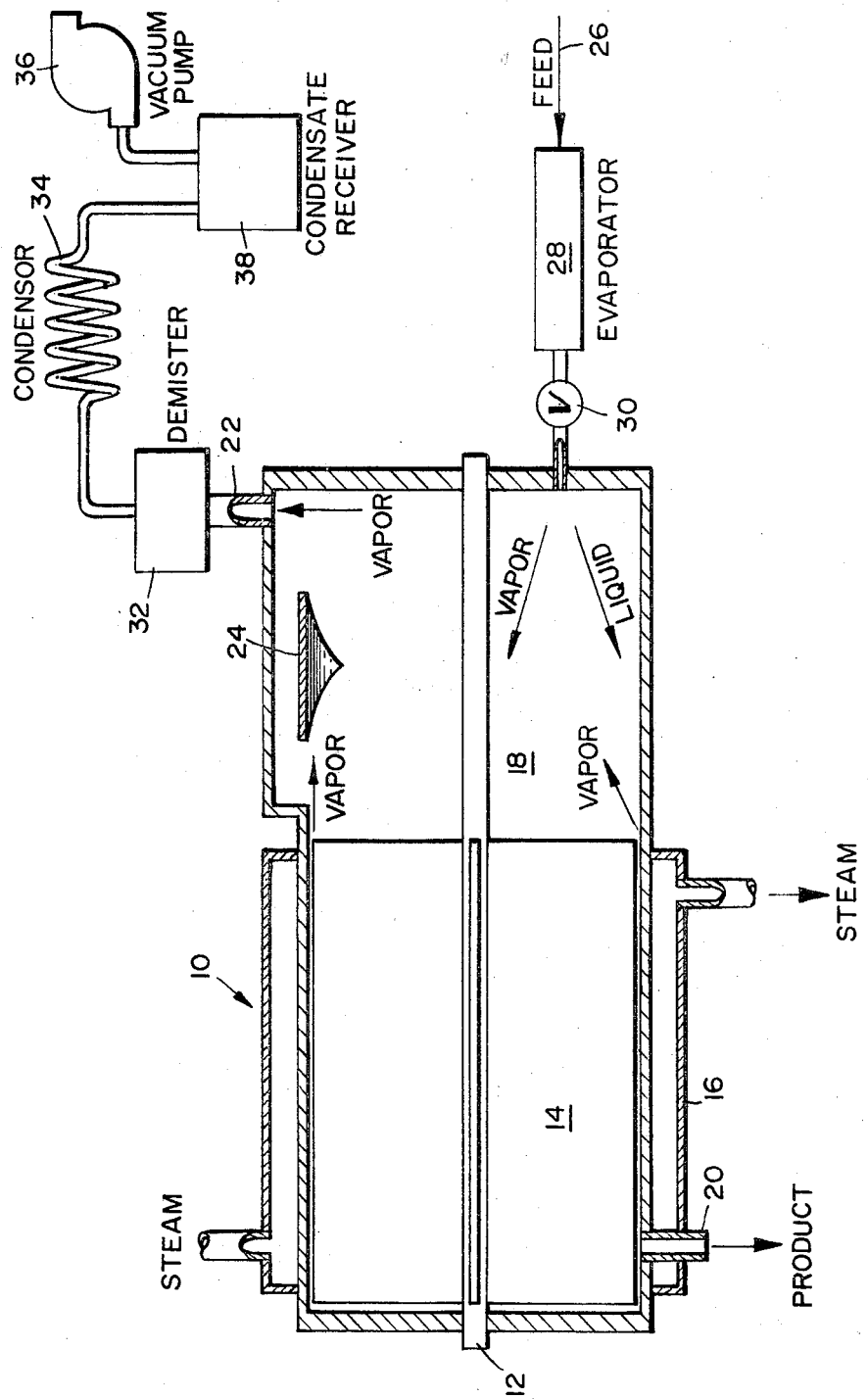
FIG. 3 is a diagrammatic view of another embodiment of my invention.

As illustrated in FIGS. 1 and 2, my system comprises in combination a horizontal or inclined axised thin-film evaporator 10 with a rising film evaporator 28. The evaporator 10 has a central rotor 12, with rotor blades 14 so as to provide a small, generally uniform thin-film space between the peripheral edges of the blades and the interior wall of the evaporator, and a product outlet 20. A heat exchange jacket 16 is about the thin-film processing section of the evaporator.

A vapor chamber 18 with a vapor outlet 22 is located adjacent the thin-film processing section of evaporator 10. The feed inlet 26 communicates with the evaporator 28 and a conduit 30 connects the outlet of evaporator 28 and the vapor chamber 18. The evaporator is a conventional single pass type evaporator such as a falling or rising film evaporator, for example, as described in U.S. Pat. No. 3,198,241, issued Aug. 3, 1965. The vapor chamber may include a baffle 24 before the vapor outlet 22 to prevent the carrying of liquid droplets out to the vapor outlet. A demister or mist eliminator 32 used to clean liquid particles from the vapor is contained within the vapor outlet 22, a condenser 34, a condensate receiver 38 and a vacuum pump 36 are connected to the vapor outlet 22.

In operation, a feed stream such as an organic solvent containing a resin, an ester type plasticizer in an alcohol, or a urea mixture to be concentrated is introduced into the single pass evaporator 28 and then the mixture of flashed vapors and liquid from the evaporator 28 is introduced via conduit 30 into vapor chamber 18 which is maintained under suitable atmospheric or sub-atmospheric conditions by pump 36. The volatile fraction of the mixture is separated in the vapor chamber 18 and is withdrawn directly through the vapor outlet 22, the demister 32 and the rest of the recovery system. The liquid or non-volatilized portion of the feed stream is processed through the mechanically-agitated thin-film evaporator 10 with the non-volatile fraction or product, the resin or ester, removed at the product outlet 20. The floor of evaporator 10 may be sloped to introduce the liquid or non-volatilized portion of the feed stream to the thin-film section, or the evaporator slightly inclined itself. Vapor resulting from the liquid processed in the thin-film processing section of evaporator 10 flows counter-current to the thin-film processed to the product outlet 20, enters vapor chamber 18 and is removed through vapor outlet 22, the demister 32, condensed in condenser 34, and recovered in receiver 38 or sent to a further distillation or processing step.

A variation of my preferred embodiment would be to have the single pass evaporator 28 communicate with one end of the vapor chamber 18 and have the vapor outlet 22 centrally located. In this manner the vapors from the pre-evaporator 28 would enter the vapor outlet in one direction and the vapor from the mechanically-agitated thin-film evaporator would enter it from the other or opposite direction thus minimizing the vapor velocity in the vapor chamber 18.

It is to be understood that although a single rising film type evaporator has been described, a plurality of rising or falling film evaporators in sequence could be used wherein the outlet of a first evaporator would be the feed inlet for a second evaporator.

A variation of my invention is shown in FIG. 3. The evaporator 28 is a pre-evaporator and a valve 30 is located between the vapor chamber 18 and the evaporator 28 to maintain a pressure differential. The liquid feed is introduced into the vapor chamber and flashed off. The concentrate, which is similar to the nonvolatilized or liquid portion generated by the rising film evaporator, is then processed in the mechanically agitated thin-film evaporator in the same manner as described above. The vapor chamber 18 is maintained under a lower pressure than found in the preheater 28, to insure that the volatilized components will readily flash off.

In addition to using the invention for the recovery of materials from a product stream the apparatus may also be used to recover usable products from residue streams. For example in the manufacture of phthalic acids the bottoms or residue comprises phthalic acids, carboxylic acids, such as acetic acid, and water. This residue may be processed through my evaporator to recover the acetic acid as the vapor stream. Another example of recovering usable products from a residue stream is the further processing of bottoms from the manufacture of vinyl esters, for example vinyl acetate monomers, which bottoms may comprise polymers, acetic acid and water.

Figure 4:
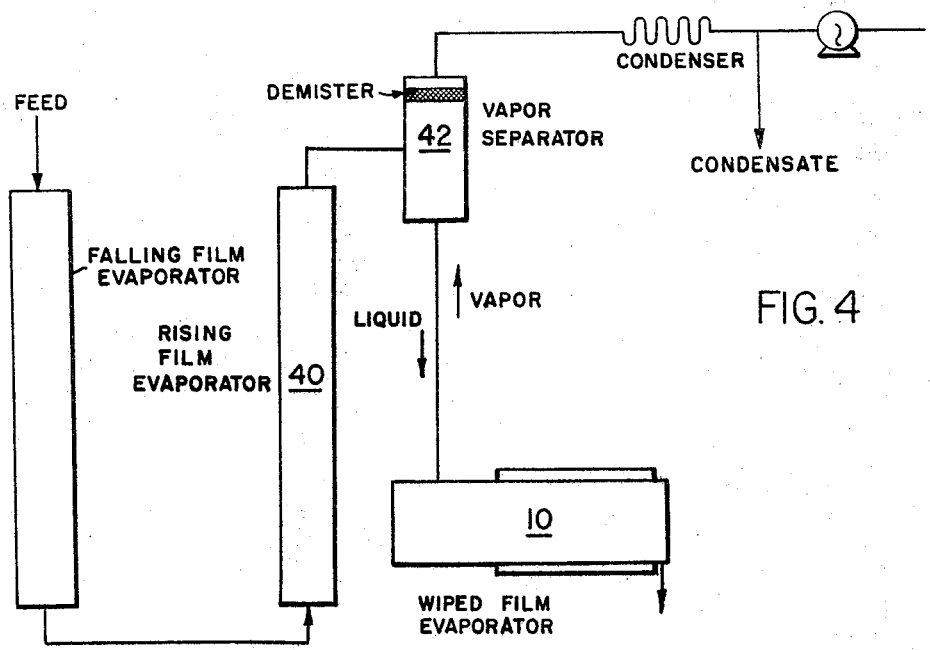
FIGS. 4 and 5 are further diagrammatic views of other embodiments of my invention.

A further alternative embodiment is shown in FIG. 4 wherein a rising film evaporator 40 discharges directly into a liquid vapor separator 42 which vapor liquid separator communicates directly with the wiped film evaporator 10 as previously described. The common vapors from the liquid vapor separator 42 and the vapor chamber of the evaporator 10 discharge to a common vapor recovery means such as a condenser, or suitable processing apparatus as required.

In the operation of this embodiment a feed stream comprising for example a mixture of acetic acid, water, polymers, and inhibitor, comprising about 1% polymer, is introduced into the film evaporator 40 and a liquid-vapor stream discharges into the vapor separator 42. At this point approximately 70% of the evaporation is completed. The vapor stream comprising acetic acid flows directly to the vapor recovery means 44. The liquid-vapor stream is discharged into the vapor chamber of the horizontally axised evaporator 10 where the liquid stream is further concentrated and discharged as a residue stream comprising approximately 50% polymer by weight. The vapors generated in the thin-film evaporator flow to the liquid vapor separator 42 and discharge with the vapors received from the rising film evaporator 40, to the vapor recovery means 44.

Figure 5:
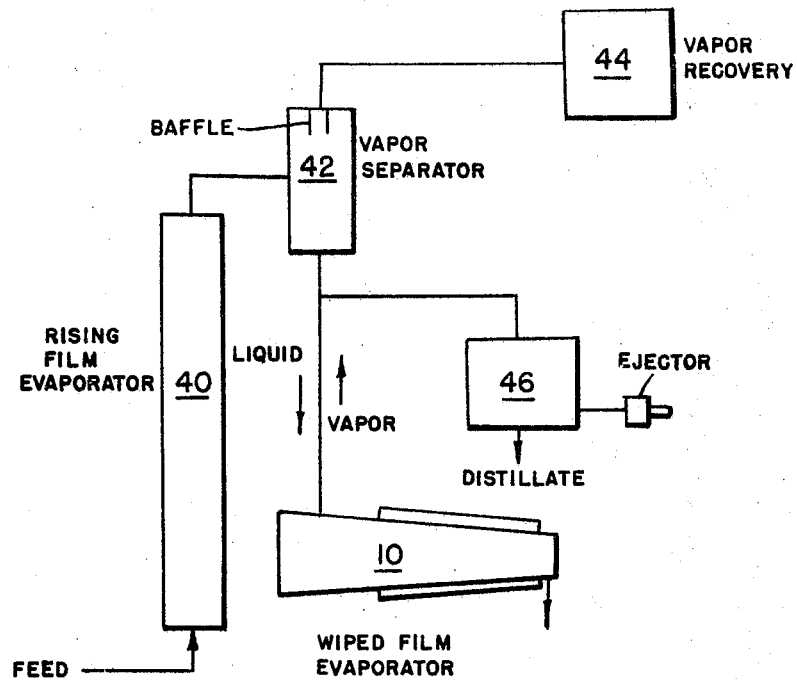

FIG. 5 is a still further embodiment of my invention wherein a condenser 46 is disposed between the vapor separator 42 and the wiped film evaporator 10 to collect distillate such as the acetic acid vaporized in the evaporator 10.

The embodiments such as shown in FIGS. 4 and 5 wherein a vapor-liquid separator 42 is interposed between the vapor chamber of the wiped film evaporator and the discharge outlet of the rising film evaporator are intended to come within the meaning of terminology "common vapor chamber." Further there may be one or a series of vapor-liquid separators disposed between the product outlet of the rising film evaporator and the wiped film evaporator. This is done merely as a matter of convenience and economics since in large scale operations the particular embodiment as represented by FIG. 1 may not always be feasible. Also it is intended by the terminology "directly discharged into the vapor chamber of the wiped film evaporator" that other auxiliary equipment such as the liquid vapor separator, shown in FIGS. 4 and 5 may be interposed between the rising film evaporator and the wiped film evaporator.

Further, if desired when other equipment such as a liquid-vapor separator is part of the common vapor chamber, the entire system may be operated under substantially uniform pressure or vacuum.

My system provides for a common condensing and recovery system, and utilies the vapor chamber both as a separation chamber and as a vapor chamber for the thin-film evaporator. The direct introduction of the feed stream in the system as shown avoids the use of a separate vapor system, piping and complex arrangement of valves while providing many and unique advantages in processing.

What I claim is:

1. An evaporation apparatus which comprises in combination:
   (a) a first tubular film-type pre-evaporator having a feed inlet and a single liquid-vapor discharge outlet;
   (b) a second horizontally-axised, mechanically-agitated, wiped thin-film evaporator having a feed inlet and a vapor outlet, a co-axial processing chamber, a rotor shaft within the chamber, rotor blades secured to the rotor shaft extending from one to the other end of the processing chamber, and further said blades extending radially and co-axially from the rotor shaft into a close relationship with the interior wall of the chamber;
   (c) a vapor chamber common to the processing chamber of the second evaporator and the liquid-vapor discharge outlet of the first evaporator disposed upstream of the processing chamber with respect to liquid flow of the second evaporator and downstream of the liquid-vapor discharge outlet of the first evaporator and having;
      (i) a feed inlet adapted to receive directly the entire liquid-vapor stream discharged from the first film evaporator and discharge directly said stream into the vapor chamber,
      (ii) a liquid outlet adapted to discharge directly into the said feed inlet-vapor-outlet end of the processing chamber of the second evaporator the liquid portion of the liquid-vapor stream, and
      (iii) a vapor outlet in said vapor chamber to remove the vapors separated from the liquid-vapor stream of the first evaporator and the vapor stream flowing from the second evaporator;
   (d) a single liquid-product outlet for the removal of processed material disposed within the second evaporator at the opposite end thereof; and
   (e) vapor-recovery means for receiving vapors from the vapor chamber common to the first and second evaporators; whereby on discharge of a pre-evaporated liquid-vapor feed stream from the first evaporator into said vapor chamber, the liquid or nonvolatilized portion of the liquid-vapor stream is processed through the second evaporator and nonvolatile product discharged from the liquid product outlet of the second evaporator, while the volatile components of both the first and second evaporators discharged to the vapor receiving means.

2. The apparatus of claim 1 wherein the first evaporator includes a plurality of sequential tubular film evaporators in which the discharge or product of one is the feed for the next.

3. The apparatus of claim 1 wherein the first evaporator is a single-pass rising-film type.

4. The apparatus of claim 1 wherein a vapor demister is contained within the vapor outlet of the vapor chamber.

5. The apparatus of claim 1 which includes means to maintain the vapor chamber under subatmospheric conditions.

6. The apparatus of claim 1 which includes a baffle in the vapor chamber to inhibit the entrainment of liquid particles in the vapor discharged to the vapor outlet.

7. The apparatus of claim 1 wherein the first evaporator is a tubular falling film pre-evaporator.

8. The apparatus of claim 1 wherein the vapor chamber includes a liquid-vapor separator disposed downstream of the discharge outlet of the first evaporator and upstream of the processing chamber of the second evaporator.

9. The apparatus of claim 1 wherein the vapor recovery means includes condensing means to condense at least a portion of the vapors discharged from said vapor chamber.

10. The apparatus of claim 1 wherein the processing chamber of the horizontally-axised evaporator diminishes in circumference from the feed end to the liquid-product outlet end.

11. A method of separating a volatile and a non-volatile component of a fluid mixture which comprises:
 (a) flowing the fluid mixture as a thin film over an internal evaporative cylindrical surface;
 (b) evaporating a portion of the volatile component from the mixture to obtain a liquid-vapor mixture;
 (c) discharging directly substantially all of the liquid-vapor mixture into a common vapor space;
 (d) separating the vaporous portion from the liquid portion in the vapor space to form a first vapor;
 (e) placing the liquid portion in continuous mechanically wiped thin-film form on generally an enclosed horizontally axised evaporative surface;
 (f) flowing the liquid in thin-film form along said evaporative surface;
 (g) evaporating a portion of the volatile component from the second liquid film to form a second vaporous portion;
 (h) flowing the second vaporous portion countercurrent to the direction of flow of the wiped thin film and discharging directly the second vapor into the common vapor space;
 (i) discharging the first vaporous portion formed in step (b) and the second vaporous portion separated in step (h) from the common vapor space to vapor recovery; and
 (j) discharging the liquid remaining from step (g) as product from the horizontal evaporative surface.

12. The method of claim 11 wherein the fluid mixture comprises in part polymers and volatile acids and the fluid mixture flows upwardly in thin-film form.

13. The method of claim 11 which includes:
 gradually diminishing the area of the horizontal wiped surface of evaporation in the direction of liquid flow.

14. The method of claim 11 wherein the volatile component is a short-chain fatty acid.

15. The method of claim 14 wherein the short-chain fatty acid is acetic acid.

16. The method of claim 11 wherein the volatile component is a short-chain fatty acid and the nonvolatile component comprises in part aromatic acids.

17. The method of claim 16 wherein the aromatic acid is phthalic acid.

18. The apparatus of claim 1 wherein said feed inlet and vapor outlet are a combined feed inlet-vapor outlet.

19. The method of claim 11 which includes flowing the liquid portion separated in step (d) countercurrent to and in the same flow path as the second vaporous portion which is separated in step (h) prior to the liquid portion being placed in wiped thin-film form.

References Cited

UNITED STATES PATENTS

| | | | |
|---|---|---|---|
| 2,310,650 | 2/1943 | Peebles. | |
| 2,570,213 | 10/1951 | Cross | 159—14 |
| 2,844,607 | 7/1958 | Gushin et al. | 260—400 |
| 2,863,888 | 12/1958 | Schurman | 260—404 |
| 2,927,634 | 3/1960 | Gudheim. | |
| 3,152,947 | 10/1964 | Monick et al. | |

FOREIGN PATENTS

| | | |
|---|---|---|
| 482,488 | 6/1953 | Italy. |

NORMAN YUDKOFF, Primary Examiner

J. SOFER, Assistant Examiner

U.S. Cl. X.R.

159—13, 49; 202—236